United States Patent
Watson et al.

(10) Patent No.: US 7,472,113 B1
(45) Date of Patent: Dec. 30, 2008

(54) QUERY PREPROCESSING AND PIPELINING

(75) Inventors: Eric Watson, Redmond, WA (US); Marcelo Calbucci, Redmond, WA (US); Sally Salas, Issaquah, WA (US); Darren Shakib, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 641 days.

(21) Appl. No.: 10/764,679

(22) Filed: Jan. 26, 2004

(51) Int. Cl.
*G06F 7/00* (2006.01)
*G06F 17/30* (2006.01)

(52) U.S. Cl. .................................. 707/3; 707/4; 707/5

(58) Field of Classification Search ................ 707/1–3, 707/4, 5; 715/533
See application file for complete search history.

(56) References Cited

U.S. PATENT DOCUMENTS

| | | | |
|---|---|---|---|
| 6,405,190 B1 * | 6/2002 | Conklin | 707/3 |
| 6,460,029 B1 * | 10/2002 | Fries et al. | 707/3 |
| 6,526,440 B1 | 2/2003 | Bharat | |
| 6,529,903 B2 | 3/2003 | Smith et al. | |
| 6,615,209 B1 | 9/2003 | Gomes et al. | |
| 6,658,423 B1 | 12/2003 | Pugh et al. | |
| 6,678,681 B1 | 1/2004 | Brin | |
| 2002/0123988 A1 | 9/2002 | Dean et al. | |
| 2002/0133481 A1 | 9/2002 | Smith et al. | |
| 2005/0004889 A1 * | 1/2005 | Bailey et al. | 707/1 |
| 2006/0075120 A1 * | 4/2006 | Smit | 709/227 |
| 2006/0122979 A1 * | 6/2006 | Kapur et al. | 707/3 |

OTHER PUBLICATIONS

S. Brin and L. Page. *The Anatomy of a Large-Scale Hypertextual Web Search Engine*. Aug. 7, 2000. http://www7.scu.edu.au/programme/fullpapers/1921/com1921.htm.
D. Bahle, H. Williams and J. Zobel. *Optimised Phrase Querying and Browsing of Large Text Database*. 2001 IEEE. pp. 11-19.
J. Zobel and A. Moffat. *Inverted Files Versus Signature Files for Text Indexing*. 1999 ACM. pp. 453-490.
D. Bahle, H. Williams and J. Zobel. *Efficient Phrase Querying with an Auxiliary Index*. 2002 ACM. pp. 215-221.
D. Dreilinger and A. Howe. *Experiences with Selecting Search Engines Using Metasearch*. 1997 ACM. pp. 195-222.
N. Fuhr. *Two Models of Retrieval with Probabilistic Indexing*. 1986 ACM. p. 249.
S. Bradshaw and K. Hammond. *Automatically Indexing Documents: Content vs. Reference*. 2002 ACM. pp. 180-181.
A. Keller and J. Basu. *A predicate-based caching scheme for client-server database architectures*. The VLDB Journal 1996. pp. 35-47.
J. French, A. Powell, F. Gey and N. Perelman. *Exploiting a Controlled Vocabulary to Improve Collection Selection and Retrieval Effectiveness*. 2001 ACM. pp. 199-206.

(Continued)

*Primary Examiner*—Wilson Lee
*Assistant Examiner*—Cheryl M Shechtman (57) ABSTRACT

Front end preprocessing modifies queries to get them in better form for presentation to a variety of data sources. The queries are modified by grouping terms as phrases, correcting spelling errors, and augmenting the query with category terms that trigger query execution on certain data sources. Context information about a particular user as well as information about previous queries by other uses are also used to modify the query to better reflect the user's intent.

41 Claims, 4 Drawing Sheets

OTHER PUBLICATIONS

K. Lee, H. Leong and A. Si. *Semantic Query Caching in a Mobile Environment*. Mobile Computing and Communications Review, vol. 3, No. 2. Date unknown but prior to Dec. 30, 2003, pp. 28-36.

M. Rodriguez-Martinez and N. Roussopoulos. *MOCHA: A Self-Extensible Database Middleware System for Distributing Data Sources*. 2000 ACM. pp. 213-224.

K. Jarvelin, J. Kristensen, T. Niemi, E. Sormunen and H. Keskustalo. *A Deductive Data Model for Query Expansion*. 1996 ACM. pp. 235-243.

R. Goldman and J. Widom. *WSQ/DSQ: A Practical Approach for Combined Querying of Databases and the Web*. 2000 ACM. pp. 285-295.

* cited by examiner

QUERY PREPROCESSING AND PIPELINING

TECHNICAL FIELD

The invention relates generally to the field of query processing and more specifically to a method and apparatus for query preprocessing and pipelining over a set of data sources to better match query results with a user intent.

BACKGROUND OF THE INVENTION

On-line database searching is now a common way of obtaining information. Many search engines such as Yahoo and Google are available for processing user generated queries on various databases. There are several obstacles that can prevent a search engine from providing the most relevant results to the user in a timely manner. For example, result relevance is a highly subjective issue that varies significantly from one user to the next. Two users may type the terms "jaguar belize" with one of those users searching for a jaguar car dealership in Belize and another searching for information about the population of jaguar cats in Belize. If each of these queries is processed identically, one of the users will not be given the results most relevant to him or her, at least not in the highest ranked results.

Another obstacle to providing relevant results is user error. Spelling mistakes and failure to group words into phrases can cause the search engine to search for records that are unrelated to the user's intended query. The user may fail to insert key words into the query that cause the search engine to access a specialized data source that contains very relevant information. The processing of a user's query may be delayed if it is directed to a highly trafficked data source when another source would have sufficed.

SUMMARY OF THE INVENTION

For use with a search engine query preprocessor, a query is modified during preprocessing so that the query is in better form for execution on one or more selected data sources. The results provided are more relevant than would have been provided if the original query had been executed on the data sources. Context information about the origin of the query is gathered to personalize the query based on the specific user entering the query. The query is given one or more query categories and the query is modified to reflect the category. The modified query is executed on a data source that contains information related to the query category.

One of the query categories may be a local query and local queries are modified to include query context information that identifies the geographic region from which the query originates. Local queries are executed on data sources that contain information about a specific geographic region such as a phone directory data source. For use in categorization, a list of query terms is mapped to categorization codes based on a category of user selected results to previous queries containing the query terms. The modified query is presented to a plurality of federation engines each of which selectively executes the modified query on a data source associated with the federation engine.

A cache may be maintained for each federation engine that stores results to previously executed queries on the associated data source. Query containing terms that are often grouped as phrases may be modified to reflect the grouping. The query may be augmented with correctly spelled versions of any misspelled query terms.

These and other objects of the invention will become understood from a detailed description of an exemplary embodiment of the invention which is described in conjunction with the accompanying drawings.

BRIEF DESCRIPTION OF DRAWINGS

The present invention is illustrated by way of example and not limitation in the figures of the accompanying drawings, in which.

DETAILED DESCRIPTION OF A PREFERRED EMBODIMENT

Figure 1:
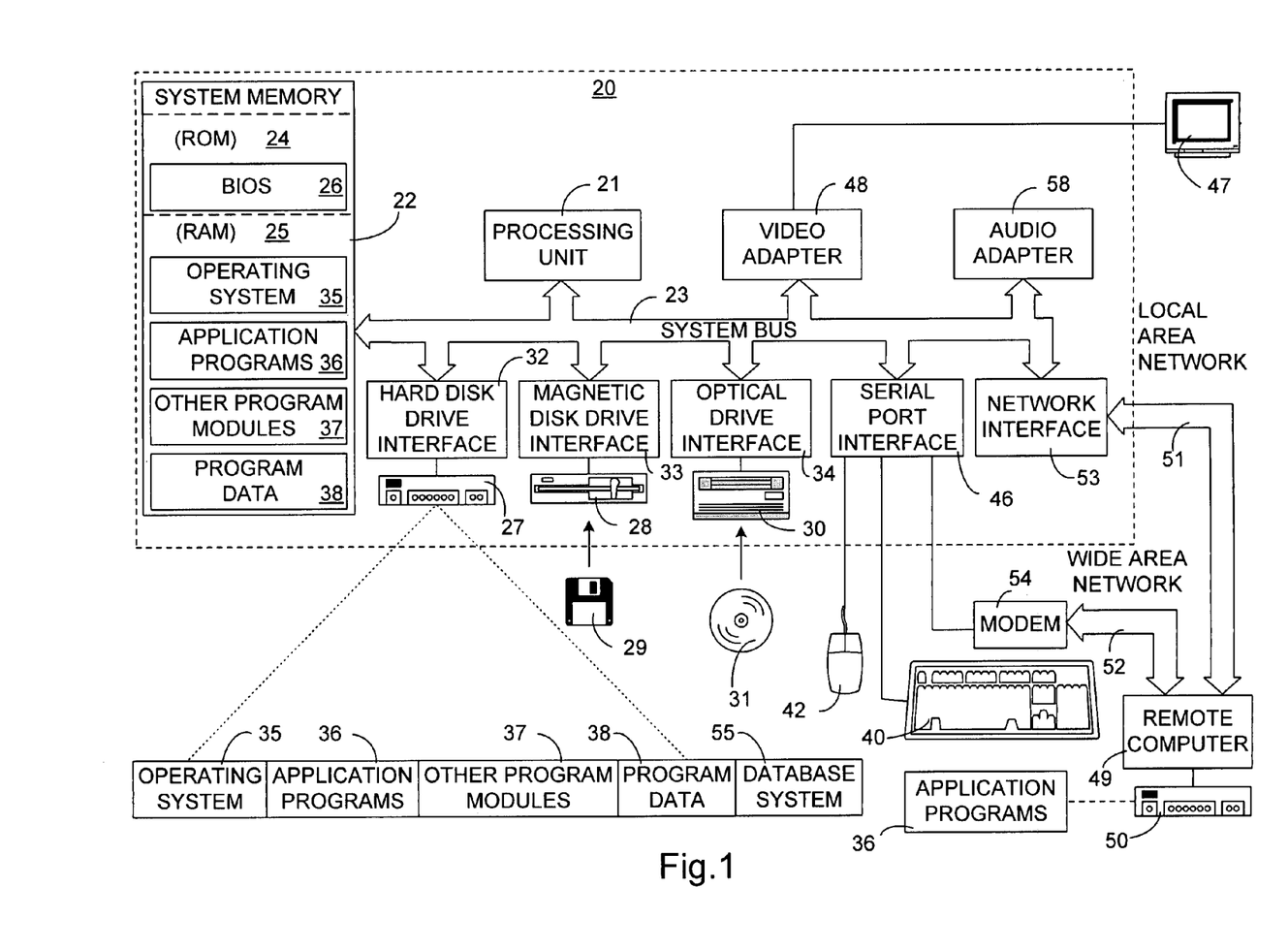
FIG. 1 illustrates an exemplary operating environment for a system for processing and routing database queries.
Figure 2:
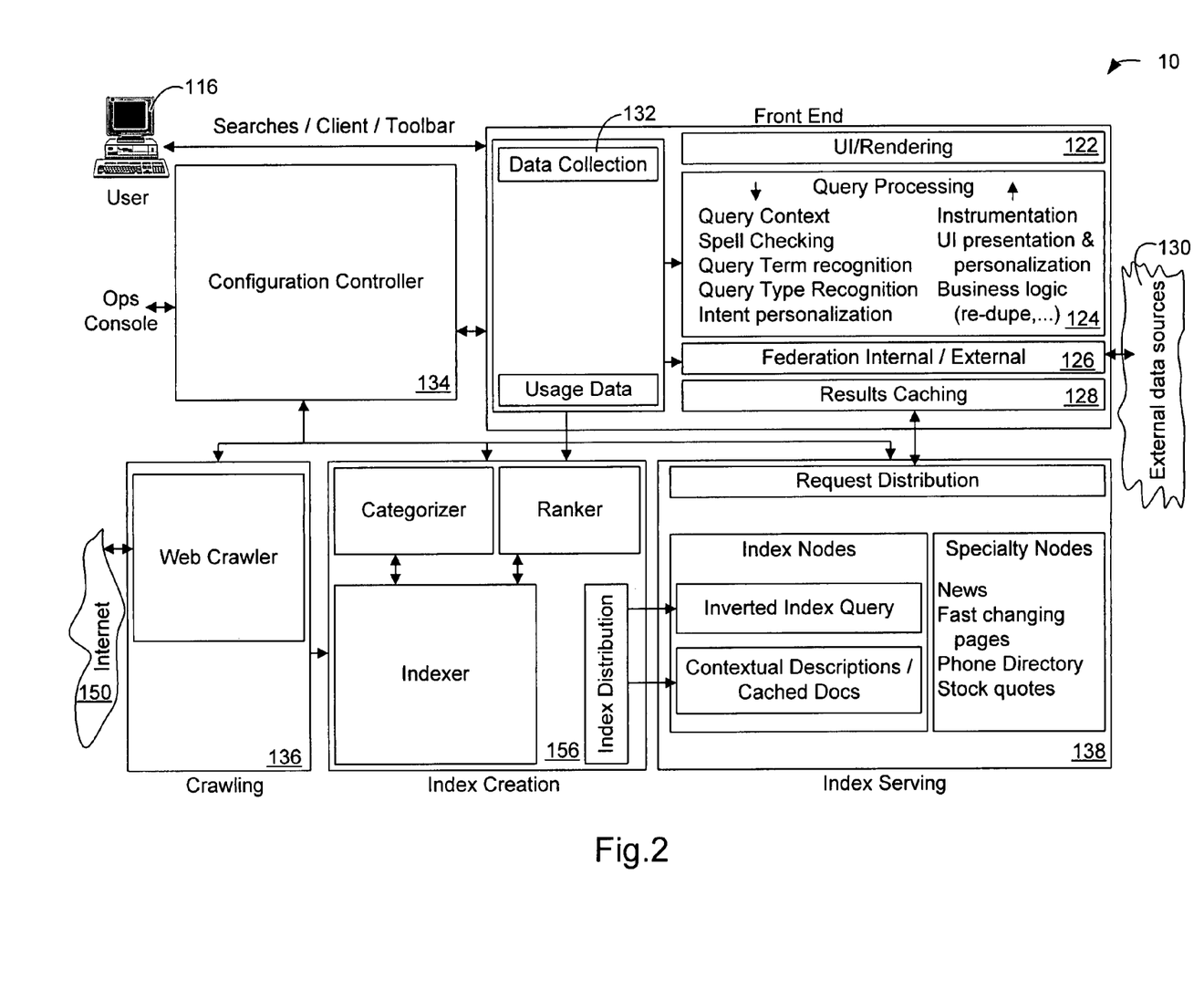
FIG. 2 is a block diagram of query processing system including a front end processor according to an embodiment of the present invention.

FIG. 2 illustrates a schematic of a front end query processor 10 constructed in accordance with one exemplary embodiment of the invention. The front end processor 10 begins its analysis when it receives a query from a user 116. Most typically, the processor is constructed in software executing on a computer system 20 (FIG. 1) such as a server computer which in turn is coupled by means of communications connections to other servers or computers by means of a network. In a most typical example the user is logged onto his or her computer and communicates with a remote computer system acting as a server by means of the Internet wide area network.

The search engine software executing on the server 20, possibly in conjunction with other federated search engines, provides a rapid response to the query. The response is provided to the user in the form of search results, typically transmitted back to the user over a network such as the Internet. The response can be formulated as a series of article or web site summaries with links to those articles or web sites embedded in the search results. A computer system 20 that can serve as a suitable query response computer is depicted in FIG. 1 and described in greater detail below.

The exemplary computer system 20 includes software that defines the front end processor 10 for evaluating the query. One possible response to receipt of a query is to re-transmit a modified form of the query to another server that performs a search based on the modified form of the query. As an example, the other source of search results could be a server hosting a travel web site that provides data about airfares, hotels etc. It could be a religious web site that maintains a list of churches in a country. It could be a site dedicated to automobile information that in turn has links to car dealerships. Other categories could include: news, local, sports, encyclopedia, history, books, movies, entertainment, etc.

The server computer system 20 depicted in FIG. 1 may also directly evaluate the query and provide a response or result based on the contents of a database maintained by the server 20. This database contains information in the form of an index of words obtained by a web crawler that searches the Internet cataloging page contents at thousands of sites. This scanning occurs on a periodic basis to assure it is an up to date representation of the contents of the site. Regardless of whether the computer system 20 searches for query results or transmits the search request to another computer, a result is formatted by the server 20 and transmitted back to the user.

Since this result contains a list of links to other sites containing documents or information, the user can click on a document and the user's web browser is redirected to an Internet address pointed to by the link.

In order to efficiently utilize search engines at other locations, the computer system 20 utilizes a query augmentation module to be described in more detail below that augments the query with terms that relate to the identified type or intent of the query. The augmented query is then sent to a internal/external data source federation broker 126 for execution on appropriate data sources.

Query Preprocessing for Pipelining to Data Sources

Referring again to FIG. 2, the user enters a query at a computer station 116 that is routed to a front end processor 10. The front end processor 10 performs functions that will be discussed in greater detail to adjust or augment the query if necessary for presentation to various data sources as well as selecting appropriate data sources for evaluating the resulting query. The front end processor can route queries to external data sources 130 and/or internal data sources such as an internal index serving block 138 that provides index summaries of the information available in web pages on the internet. The index serving block 138 includes an inverted index of terms in the web pages and text descriptions of the information available on the web page. An index creation module 156 and web crawler 136 access the internet 150 to update and maintain the index server 138.

A search engine configuration controller 134 contains instructions that act as a "road-map" to guide the execution of each query by configuring which services, facilities and federations should be performed on a specific query. For example, a query configuration for queries in English originating in the United States would require execution of certain pre-processing steps and certain data sources would be selected or de-selected for execution of the query. The query as input by the user at the workstation 116 and the query configuration that is provided by the configuration controller 134 are combined to form a request that is presented to the front end processor 10, which is described in more detail with reference to FIG. 4.

Figure 4:
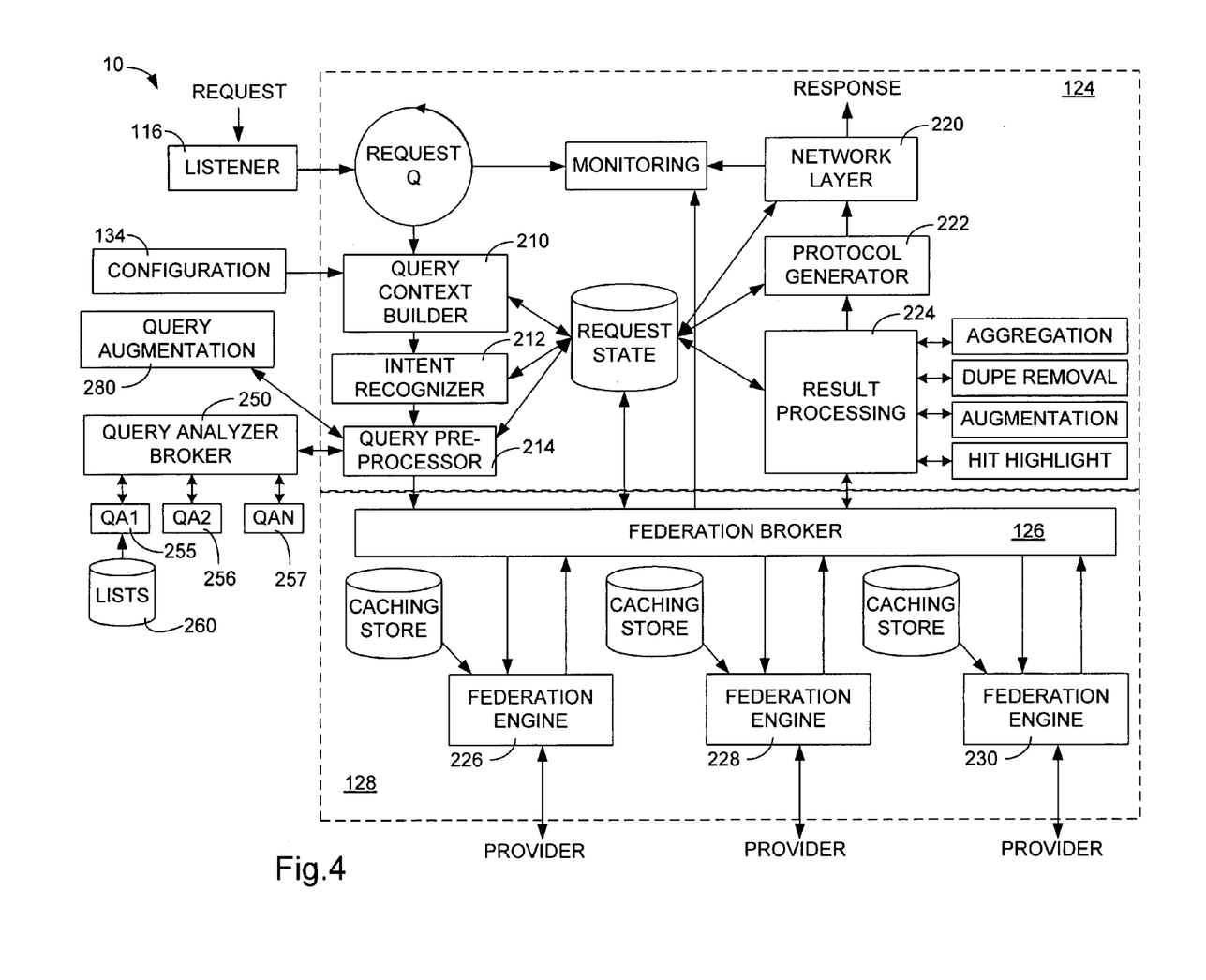
FIG. 4 is a block diagram showing more detail of the front end processor of FIG. 2.

The front processor 10 includes a query processor component 124. The processor component 124 determines what steps should be used to execute the query. The query processor 124 parses the query on its individual elements by identifying the individual words of the query and any query language keywords that are embedded in a query. A query augmentation module 280 can be called by a query preprocessor 214 to augment a query with augmentation terms and/or weighting values for query terms that may be helpful during federation or results ranking. Federation is the process of evaluating a query on numerous data sources often in parallel. The query preprocessor 214 obtains information to be used to augment the query from a variety of sources such as a context builder 210 and an intent recognizer 212. The context builder 210 gathers information about the origin of a query that may be helpful in determining the query's intent. For example, given that the user came from a site of "cars" the context builder may infer that the query is likely related to automobiles and pass this information to the augmentation module. This context information is used by other preprocessing components to "personalize" queries by assigning an intent or category to queries.

The augmentation module 280 may then be called to add a query category term corresponding to "cars" and a percentage indicator that indicates the amount of confidence that the augmented term "cars" reflects the true intent of the query.

The augmented query is passed to the federation broker 126. Some types of information that may be used by the context builder to construct a query context include: previous queries executed by this user, age of this user, zip code of this user that may be accessed from an IP reverse lookup, the referring web site, browser and operating system information, browser settings, such as current language, and user entered preferences such as the number of results or display preferences.

A query personalization or intent recognition module 212 determines a probable intent or categorization of terms in the query based on context information about the given user and information about typical users that have previously accessed the system. To determine the likely intent of the query, the intent recognition module calls a query analyzer broker 250 that presents the query to several query analyzers 255, 256, 257 that perform intent recognition. One type of intent recognition is implemented by a query analyzer that presents a question to the user entering the query to select from among multiple meanings that could be ascribed to a query term. Two other types of intent recognition are algorithmic or list-match. An algorithmic intent recognizer uses heuristic rules to ascribe a likely meaning to the words that the user typed. A simple example is phone numbers. The rule to detect if a phone number was typed could be: three digits followed by a separator followed by seven digits or three digits followed by a separator followed by four more digits. If a phone number is recognized, the federation broker might use this information to decide to route the query to a phone book provider or other localized data source. Other patterns that might be recognized using an algorithmic recognizer are zip codes, e mail address, URLs, and UPS tracking numbers.

Another type of query analyzer is a list-match recognizer. The list-match recognizer uses a dictionary lookup list 260. Each entry in this dictionary contains a word or phrase by itself, the candidate category, and the probability of that match. The list can be compiled and updated based on previous queries presented to the search engine and which results to those queries were selected by the users. For example, if 60% of users who entered queries that include the term "jaguar" selected results pertaining to cars from the result list, a probability of match for jaguar and a category of cars is then listed as 60%. The dictionary list 260 may include the entry "Paris—city (80%); hotel (40%)." So, if a user types a query like "Paris Hotel in Las Vegas", the list-match recognizer will indicate that specific parts of that query contain city (Paris, Las Vegas), hotel (Paris) and travel (hotel). The recognizer will report not only what category each word or phrase belongs to, but also the position on the phrase. In the example above, this is what the recognizer would report for the query "Paris Hotel in Las Vegas":

Characters 1-5: Hotel (40%)
Characters 1-5: City (80%)
Characters 7-11: Travel (80%)
Characters 16-24: City (90%)

The query recognizer reports the information to the query preprocessor 214 and the query preprocessor calls the query augmentation module 280 to augment the query with query category terms and confidence values to be sent on to the federation broker 126.

Figure 3:
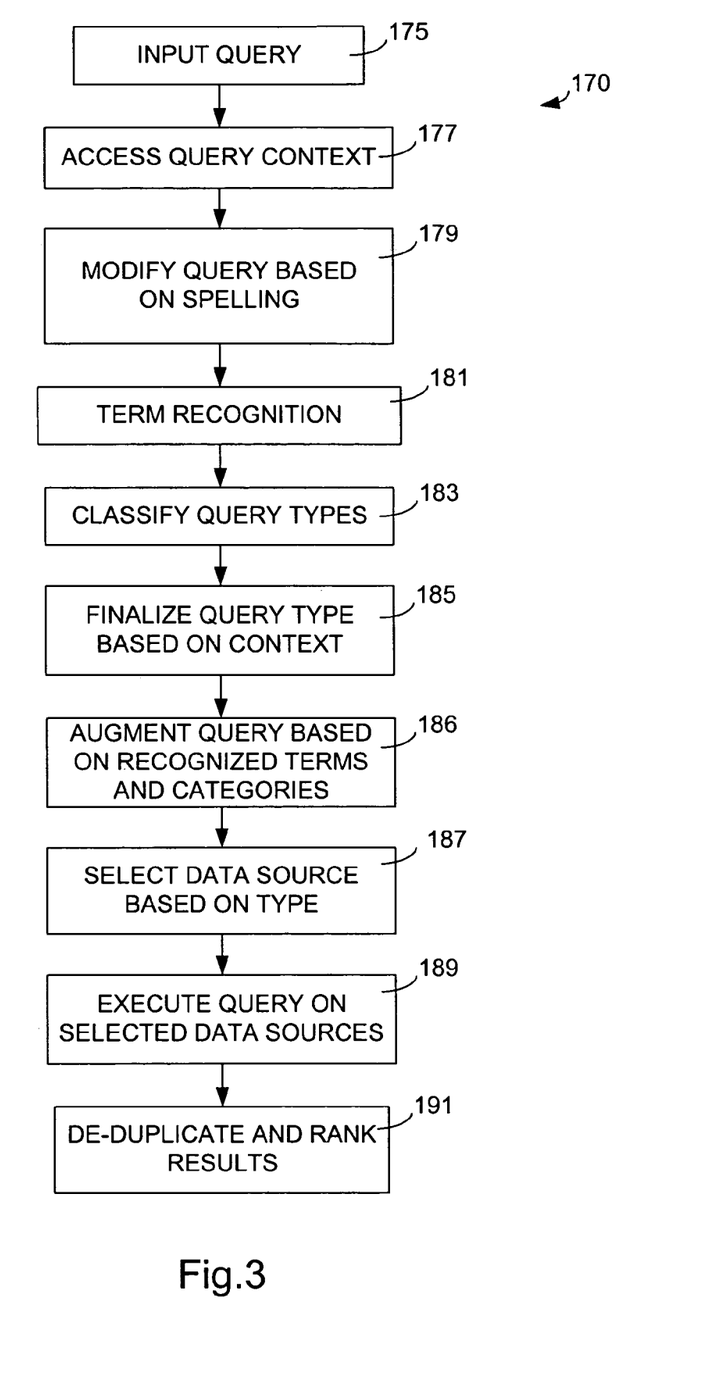
FIG. 3 is a flow chart of a method for processing queries according to an embodiment of the present invention.

FIG. 3 is a flow chart of a query preprocessing method 170 performed by the query processor 124 on an incoming query. The query processor receives an input query in step 175 and accesses query context information in step 177 regarding the specific user such as the geographical and internet (web page) origin of the query, web sites recently visited by the user, or queries recently entered by the user and the results to those queries that were selected by the user. The query processor then performs several functions on the query to modify or augment the query to optimize the query to quickly return results that are likely most relevant to this particular user.

In step 179 (FIG. 3) the query processor performs a spell check on the query and changes the spelling of terms in the query that are misspelled. In another embodiment, spell checking is performed during execution of the query by executing the query on a spell check provider. The query processor scans the spell-corrected query for terms that should be grouped as phrases in step 181. The query processor may use information about commonly executed queries to determine which terms should be grouped as phrases. For example if the vast majority of users entering queries that include the terms "george" and "bush" pursue results that have "george" and "bush" as a phrase, the preprocessor will group these terms as a phrase in future queries prior to execution on the data sources. In step 183 the query processor accesses the query analyzer broker 250 (FIG. 4) to gather intent information. The identification of these terms may cause the query processor to determine that a query is a local query pertaining to a given geographic region. Based on the presence of query terms that are mapped to corresponding query category terms, the query type can be classified.

In step 185, the user's likely intent is determined based on query context. For example, if the user has recently been entering numerous queries searching for cars or if the query has been entered in a web search box on a car seller's web page, the "car meaning" of the term jaguar will be used. In step 186 the augmentation module is called to augment the query with weighted localized augmentation terms and/or query category terms and confidence values to construct an augmented query that will help direct the search engine to more relevant results. The query preprocessor may call the augmentation module to augment the original query terms with a relative weight based results from the query analyzer broker. The augmentation module may also augment the query with terms that have a negative confidence value to weed out hits that contain a term that means the hit is likely not relevant. In addition, the query category terms have an identifier (such as a prefix consisting of a combination of characters that are not part of any search term) built into them so that they can be recognized as being added by the augmentation module. The original query is thus preserved and the augmented category terms may be disregarded by the data source if desired.

Based on the augmented or modified query, the query processor selects a set of data sources upon which to execute the query in step 187. A federation broker 126 (FIG. 4) that selects and calls federation engines 226, 228, 230 and gathers the responses from the called federation engines. Each federation engine 226, 228, 230 bridges the federation and caching system with a provider. A provider can be an internal provider, such as the index serving block 138 (FIG. 2), or an external provider such as an encyclopedic, news, travel, document serving, or phone directory provider. Based on the list of federation engines provided by the query configuration controller 134, each federation engine 226, 228, 230 determines whether to send the query to the provider or not based on the presence or absence of certain terms in the query. For example, the travel federation engine may call the travel provider if the query contains a city, a hotel, or a travel term in it, but would not call the travel provider otherwise. The travel federation engine may not call the travel provider if adult or other terms are detected that would likely indicate something other than travel is sought by the query. By selectively executing the query on providers, expense in executing queries on providers that would not likely have relevant results is reduced.

The original list of providers from the configuration controller 134 is reduced based on the determination of the federation engines 226, 228, 230. The remaining federation engines are separated into two categories, federation engines that do not depend on results from other federation engines and those federation engines that do depend on results from other federation engines. The federation engines that do not depend on others are called immediately and in parallel. As the federation engines 226, 228, 230 begin to return results, the list of federation engines with dependency is checked and those federation engines depending on returned results are then called to execute the query.

Each federation engine 226, 228, 230 determines whether it calls another provider, another application on the same machine, or simply returning preset results. Travel providers are one example of a provider that a federation engine calls through the network. The speller system is one example of a federation engine that calls another application on the same machine. In one embodiment, the speller is treated like any other federation provider, the difference is that URLs are not returned from the speller, but rather spell suggestions for the query are returned.

Returning to FIG. 3, in step 189 the query may be executed concurrently on the data sources or preferred data sources may be accessed first and other data sources used in the case the preferred data sources do not provide sufficient results or "time out" due to overload or technical difficulties. In order to provide results to popular queries quickly, the query processor caches the results to popular queries (results caching 128 in FIG. 2). Results caching is a facility that is available to each federation engine. A significant number of queries are repeated numerous times per hour. Building a cache for frequently occurring queries improves the system performance as well as the user experience, since the federation engine can get results form the cache more quickly than accessing a provider.

The query processing module 124 also performs post processing operations 224 on the returned results. The returned results are aggregated, de-duplicated, re-federated if not enough results are returned, and highlighted to build a response based on context information and query type. The post processing aggregates the results into a single sequence of results. This can be done using business rules or ranking merging. Business rules mean that results form certain providers must come in specific order due to contractual obligations or user experience. Ranking merging implies that each federation engine returned a rank score for each result to the query and a normalization formula is applied on the rank score to merge the scores. The rank merge can be based on rank score distribution, rank score range, bucket distribution of rank score, trust factor for each federation engine provider, or query intent information.

The confidence values associated with augmented terms also play a role in ranking. A result containing a query term having a higher confidence level associated with it may be ranked higher than a result that contains a query term with a lower confidence level. The rank score of a provider's results may be adjusted/reduced based on the confidence value of the query terms it contains. In addition, the presentation of the ranked results may be personalized based on recorded user preferences. The ranked results may also be recorded to an instrumentation database that records original queries, resultant queries, results, and which results were selected by the user. The instrumentation database is used to monitor the success of the search engine.

During the process of aggregating results, if some providers have returned duplicate results, the duplicates are removed. During the de-duplication process, enough results may be removed that there is no longer a sufficient number of results and the query is re-federated to get more results from those that have already returned results.

After the results are returned, hit highlighting is applied to the results. Words and phrases on the title and description of a result that are similar or identical to those in the query are highlighted. The response is then built and submitted back to the front end.

Exemplary Operating Environment

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disk drive 30 for reading from or writing to a removable optical disk 31 such as a CD ROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk, magnetic disk 129, optical disk 31, ROM 24 or RAM 25, including an operating system 35, one or more application programs 36, other program modules 37, and program data 38. A database system 55 may also be stored on the hard disk, magnetic disk 29, optical disk 31, ROM 24 or RAM 25. A user may enter commands and information into personal computer 20 through input devices such as a keyboard 40 and pointing device 42. Other input devices may include a microphone, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 1. The logical connections depicted in FIG. 1 include local area network (LAN) 51 and a wide area network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other means for establishing communication over wide area network 52, such as the Internet. Modem 54, which may be internal or external, is connected to system bus 23 via serial port interface 46. In a networked environment, program modules depicted relative to personal computer 20, or portions thereof, may be stored in remote memory storage device 50. It will be appreciated that the network connections shown are exemplary and other means of establishing a communications link between the computers may be used.

It can be seen from the foregoing description that building and maintaining statistical information on intermediate query results can result in more efficient query plans. Although the present invention has been described with a degree of particularity, it is the intent that the invention include all modifications and alterations from the disclosed design falling within the spirit or scope of the appended claims.

We claim:

1. For use with a search engine, a query pre-processing pipelining computing system that prepares to selectively execute a user entered query made up of a string of query terms on one or more of a plurality of data sources, the computing system comprising:
 a processor and/or storage media configured with:
  a query term recognizer that, before execution of the query, examines the query terms and identifies and automatically groups query terms that are intended as a phrase, wherein the query is a new query for which the user is requesting data that satisfies the query;

a query type recognizer that, before execution of the query, examines the query terms and automatically categorizes the query as one of a plurality of query types;

a query intent personalizer that gathers information about the user who entered the query and provides this information to the query term recognizer and query type recognizer to be used before execution of the query;

a query modifier that, before execution of the query, modifies the user entered query based on the term grouping determined by the query term recognizer and based on the query type determined by the query type recognizer; and a query federation module that selects one or more data sources from the plurality of data sources and causes execution the modified query on the one or more selected data sources, a data source comprising a source of data that can receive queries and execute the queries by searching for data of the data source that matches the query.

2. The system of claim 1 comprising a spell checker that recognizes misspelled query terms and replaces the misspelled query terms with correctly spelled terms and wherein the query term recognizer and query type recognizer examine the correctly spelled terms.

3. The system of claim 2 wherein the spell checker augments the query with correctly spelled terms and wherein the query term recognizer and query type recognizer examine the augmented query.

4. The system of claim 1 comprising a query term list that maps possible query terms to other terms with which they are often grouped and wherein the query term recognizer refers to the query term list to identify and group terms as phrases.

5. The system of claim 4 wherein the query term list is based on user selected results to previous queries containing query terms that were grouped as a phrase in the selected results.

6. The system of claim 1 comprising a query term list that maps possible query terms to categorization terms and wherein the query type recognizer refers to the query term list to assign a type to the query.

7. The system of claim 6 wherein the query term list maps terms to query categories based on user selected results to previous queries that included the query terms.

8. The system of claim 1 wherein the query type recognizer includes a local pattern recognizer that identifies query terms that identify the query as a local query seeking information related to a specific geographic region from which the query originated.

9. The system of claim 8 wherein the query type recognizer augments the query with information about the specific geographic region when a local query is identified.

10. The system of claim 9 wherein the query federation module selects a phone directory data source upon which to execute the local query.

11. The system of claim 1 wherein the query intent personalizer includes a context builder that retrieves information about the user entering the query.

12. The system of claim 11 wherein the information about the user includes web sites recently accessed by the user.

13. The system of claim 1 wherein the federation module includes a plurality of federation engines each dedicated to a specific data source and wherein each federation engine selectively executes the modified query on its data source based on the presence of triggering query terms in the modified query.

14. The system of claim 13 wherein each federation engine has an associated cache that saves results to previous queries that were returned to the federation engine from its data source.

15. The system of claim 1 comprising a query tracking module that records a user entered query, a modified query corresponding to the user entered query, and results returned by the modified query that were selected by the user.

16. For use with a search engine query preprocessor, a method that selectively executes a query made up of a string of query terms on one or more of a plurality of data sources, a data source comprising a source of data that can receive queries and execute the queries by searching for and returning data matching the queries, the method comprising:

obtaining context information about the origin of the query before execution of the query, wherein the query is a new query for which the user is requesting data corresponding to the query;

automatically classifying the query as one of a set of query categories by selecting one of a set of query categories based on the presence of query terms and context information, the classifying being performed before execution of the query;

automatically modifying the query to include the query category, the modifying being performed before execution of the query; and selecting one of the data sources based on the data source having data in the query category to which the query was classified, and causing execution of the modified query on the selected data source, the execution comprising searching for data of the data source that matches the query.

17. The method of claim 16 comprising maintaining a list of query terms mapped to categorization codes and wherein the query is classified by selecting a category code that corresponds to query terms in the query.

18. The method of claim 17 wherein the list of query terms is mapped to categorization codes based on a category of user selected results to previous queries containing the query terms.

19. The method of claim 17 comprising presenting the modified query to a plurality of federation engines each of which selectively executes the modified query on a data source associated with the federation engine.

20. The method of claim 19 comprising maintaining a cache for each federation engine that stores results to previously executed queries on the associated data source.

21. The method of claim 16 wherein one of the query categories is a local query and wherein the local queries are modified to include query context information that identifies the geographic region from which the query originates.

22. The method of claim 21 wherein the data source is a phone directory data source.

23. The method of claim 16 comprising grouping query terms as phrases and modifying the query to reflect the grouping.

24. The method of claim 23 wherein terms are grouped as phrases when previous queries containing the terms returned user selected results that grouped the terms as phrases.

25. The method of claim 16 comprising augmenting the query with correctly spelled versions of any misspelled query terms.

26. A computer readable medium comprising computer executable instructions for performing the method of claim 16.

27. For use with a search engine query preprocessor, a computer readable storage medium comprising computer executable instructions for performing a process of preparing for and executing a query made up of a string of query terms on one or more selected data sources, a data source comprising a source of data that can receive queries and execute the queries by searching for and returning data matching the queries, the process comprising:

obtaining context information about a user entering the query, the obtaining being performed before executing the query, wherein the query is a new query for which the user is requesting data corresponding to the query;

examining the query terms and automatically grouping terms that are intended as a phrase based on the gathered context, the examining being performed before execution of the query;

examining the query terms and automatically categorizing the query as one of a plurality of query types based on the gathered context, the classifying being performed before execution of the query;

modifying the user entered query based on the term grouping and query type, the modifying being performed before executing the query; and     selectively executing the modified query on one or more of the data sources, the executing comprising searching for data of the one or more data sources that matches the query.

28. The computer readable medium of claim 27 wherein the computer-executable instructions comprise replacing any misspelled query terms with correctly spelled terms examining the query containing the correctly spelled terms.

29. The computer readable medium of claim 27 wherein the computer-executable instructions comprise mapping possible query terms to other terms with which they are often grouped in a grouping list and identifying terms to be grouped as phrases based on the grouping list.

30. The computer readable medium of claim 27 wherein the computer-executable instructions comprise mapping possible query terms to categorization terms in a categorization list and assigning a type to the query based on the categorization list.

31. The computer readable medium of claim 27 wherein the computer-executable instructions comprise recognizing local query terms that identify the query as a local query seeking information related to a specific geographic region from which the query originated.

32. The computer readable medium of claim 31 wherein the computer-executable instructions comprise augmenting the query with information about the specific geographic region when a local query is identified.

33. The computer readable medium of claim 27 wherein the computer-executable instructions comprise presenting the modified query to a plurality of federation engines each dedicated to a specific data source and wherein each federation engine selectively executes the modified query on its data source based on the presence of triggering query terms in the modified query.

34. The computer readable medium of claim 33 wherein each federation engine has an associated cache that saves results to previous queries that were returned to the federation engine from its data source.

35. For use with a search engine query preprocessor, an apparatus for executing a query made up of a string of query terms on selected data sources, a data source comprising a source of data that can receive queries and execute the queries by searching for and returning data matching the queries, the apparatus comprising:

a processor and a system memory;

means for obtaining context information about the origin of the query, the obtaining being performed before executing the query, wherein the query is a new query for which a user is requesting data corresponding to the query;

means for classifying the query as one of a set of query categories by automatically selecting one of a set of query categories based on the presence of query terms and context information, the classifying being performed before execution of the query;

means for automatically modifying the query to include the query category, the modifying being performed before execution of the query; and     means for executing the modified query on one of the data sources that contains information related to the query category, the one of the data sources having been selected based on its corresponding to the query category, the executing comprising searching for data of the one or more of the data sources that matches the query.

36. The apparatus of claim 35 comprising means for maintaining a list of query terms mapped to categorization codes and wherein the means for classifying selects a category code that corresponds to query terms in the query.

37. The apparatus of claim 36 wherein the list of query terms is mapped to categorization codes based on a category of results to the queries containing the query terms that were selected.

38. The apparatus of claim 35 comprising means for presenting the modified query to a plurality of federation engines each of which selectively executes the modified query on a data source associated with the federation engine.

39. The apparatus of claim 38 comprising means for maintaining a cache for each federation engine that stores results to previously executed queries on the associated data source.

40. The apparatus of claim 35 comprising means for grouping query terms as phrases and means for modifying the query to reflect the grouping.

41. The apparatus of claim 35 comprising means for augmenting the query with correctly spelled versions of any misspelled query terms.

* * * * *